United States Patent
Bolen

(10) Patent No.: US 8,880,747 B2
(45) Date of Patent: Nov. 4, 2014

(54) ENDPOINT DEVICE DISCOVERY SYSTEM

(75) Inventor: Austin Patrick Bolen, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 3 days.

(21) Appl. No.: 13/472,172

(22) Filed: May 15, 2012

(65) Prior Publication Data

US 2013/0311680 A1    Nov. 21, 2013

(51) Int. Cl.
*G06F 3/00* (2006.01)
*G06F 9/44* (2006.01)

(52) U.S. Cl.
CPC .................................... *G06F 9/4411* (2013.01)
USPC .................................................. 710/8; 710/10

(58) Field of Classification Search
CPC ..................................................... G06F 9/4411
USPC ..................................................... 710/10, 302
See application file for complete search history.

(56) References Cited

U.S. PATENT DOCUMENTS

| | | | |
|---|---|---|---|
| 6,389,495 B1 * | 5/2002 | Larky et al. ....................... 710/8 |
| 6,639,914 B1 * | 10/2003 | Choi et al. ..................... 370/389 |
| 7,069,360 B2 * | 6/2006 | Thurlo et al. .................. 710/104 |
| 7,743,171 B1 * | 6/2010 | Hwang et al. ...................... 710/5 |
| 2002/0103945 A1 * | 8/2002 | Owen et al. ...................... 710/10 |
| 2007/0005859 A1 * | 1/2007 | Diefenbaugh et al. ........ 710/260 |
| 2007/0208889 A1 * | 9/2007 | Irisawa ........................... 710/33 |
| 2012/0072633 A1 * | 3/2012 | Elboim ......................... 710/302 |
| 2014/0068111 A1 * | 3/2014 | Fujimoto .......................... 710/5 |

* cited by examiner

*Primary Examiner* — Ernest Unelus
(74) *Attorney, Agent, or Firm* — Haynes and Boone, LLP

(57) ABSTRACT

An endpoint device discovery system includes a downstream port. A register is coupled to the downstream port. An endpoint ready status bit may be set in the register in response to an endpoint ready message received at the downstream port. A non-transitory computer-readable medium is coupled to the register and includes computer-readable instructions that, when executed by a processor, cause the processor to determine that the endpoint ready status bit is set and, in response, configure an endpoint device that is coupled to the downstream port. The endpoint device discovery system may be included in an information handling system (IHS) in order to provide for discovery of endpoint devices that are coupled to the IHS as soon as those endpoint devices have initialized.

20 Claims, 5 Drawing Sheets

ENDPOINT DEVICE DISCOVERY SYSTEM

BACKGROUND

The present disclosure relates generally to information handling systems (IHSs), and more particularly to and endpoint device discovery system in an IHS.

As the value and use of information continues to increase, individuals and businesses seek additional ways to process and store information. One option is an IHS. An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Many IHSs include the ability to connect endpoint devices to the IHS in order to expand the functionality of the IHS. For example, typical IHSs may include Peripheral Component Interconnect express (PCIe) expansion buses that are either coupled to PCIe endpoint devices embedded on a motherboard or coupled to PCIe connectors that allow PCIe endpoint devices to be connected to the IHS. When a PCIe endpoint device is initially powered on, or a reset of the PCIe endpoint device occurs, the PCIe endpoint device initializes. During PCIe endpoint device initialization, any attempt by software or firmware in the IHS to poll or access the PCIe endpoint device can result in the PCIe endpoint device failing to initialize, the IHS crashing, and/or a variety of other errors known in the art.

Conventionally, this problem is solved by requiring software or firmware in IHS's to wait a minimum time before attempting to poll or access PCIe endpoint devices after power-on or reset. While the current PCIe specification (3.0) requires software or firmware to wait at least 100 milliseconds after power-on or reset before attempting to poll or access PCIe endpoint devices, typically IHSs require their software or firmware to wait 1 second to ensure proper IHS operation. However, many PCIe endpoint devices require much less time to initialize (e.g., on the order of a few milliseconds) than even the minimum time required by the current PCIe specification. Thus, current PCIe endpoint device discovery methods unnecessarily slow down PCIe endpoint discovery and provide a less than optimal user experience.

Accordingly, it would be desirable to provide an improved endpoint device discovery system.

SUMMARY

According to one embodiment, an endpoint device discovery system includes a downstream port; a register coupled to the downstream port, wherein an endpoint ready status bit is operable to be set in the register in response to an endpoint ready message received at the downstream port; and a non-transitory computer-readable medium coupled to the register and comprising computer-readable instructions that, when executed by a processor, cause the processor to determine that the endpoint ready status bit is set and, in response, configure an endpoint device that is coupled to the downstream port.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
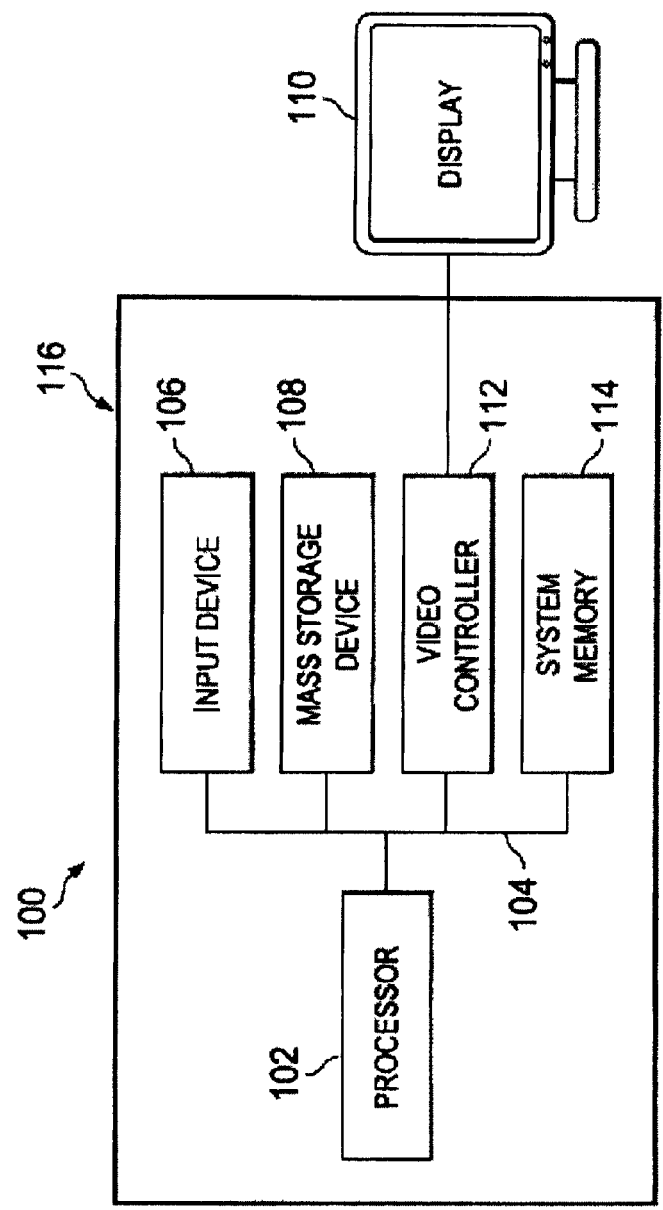
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
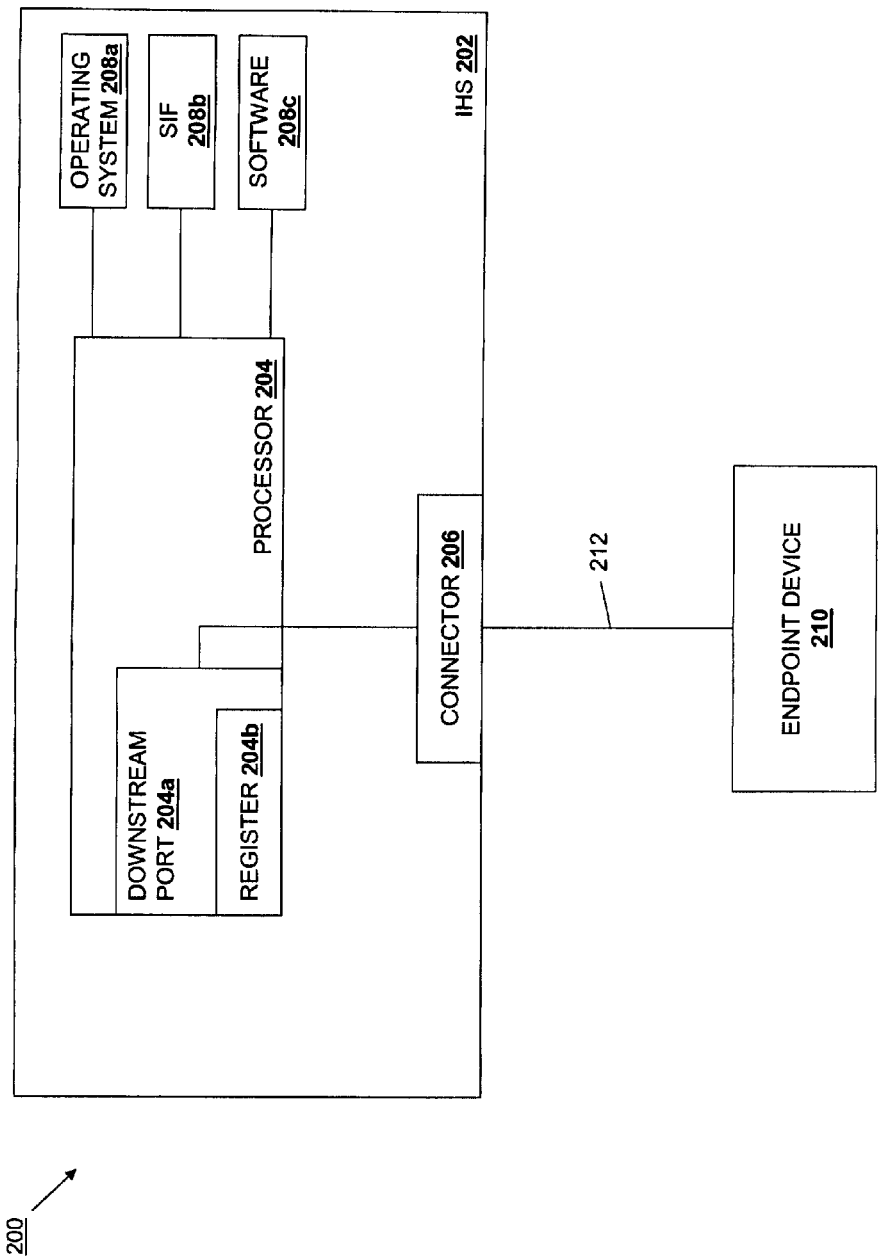
FIG. 2a is a schematic view illustrating an embodiment of an endpoint device discovery system.

Referring now to FIG. 2a, an embodiment of an endpoint device discovery system 200 is illustrated. The endpoint discovery system 200 includes an IHS 202, which may be included in or an embodiment of the IHS 100, described above with reference to FIG. 1. The IHS 202 includes a processor 204 which may be, for example, the processor 102, described above with reference to FIG. 1. In the embodiment illustrated and discussed below, the endpoint device discovery system 200 includes a PCIe system. However, one of skill in the art will recognize that a variety of systems other than PCIe systems will fall within the scope of the present disclosure. In an embodiment, the processor 204 includes a downstream port 204a. For example, in the PCIe system of the illustrated embodiment, a root complex device may connect the processor 204 and memory subsystem (e.g., the system memory 114 discussed above with reference to FIG. 1) to PCIe switch fabric that includes one or more switch devices, and the root complex device may include a plurality of PCIe ports, such as a root port, a switch port, and/or a variety of other PCIe ports known in the art. Furthermore, one of skill in the art will recognize that a variety of other non-PCIe root ports, switch ports, and/or other downstream ports will fall within the scope of the present disclosure. While the downstream port 204a (and thus, in some embodiments, the root complex device) is illustrated as being integrated with the processor 204, one of skill in the art will recognize that downstream ports may be implemented as devices that are discrete from the processor 204 while remaining within the scope of the present disclosure. The downstream port 204a includes a register 204b.

A connector 206 is connected to the downstream port 204a through a connection with the processor 204 (e.g., through a bus). In the embodiment described below, the connector 206 is a PCIe connector, but one of skill in the art will recognize that a variety of connectors (e.g., Universal Serial Bus (USB) connectors) will fall within the scope of the present disclosure. Any or all of an operating system 208a, a system initialization firmware (SIF) 208b (e.g., a Basic Input/Output System (BIOS), a Unified Extensible Firmware Interface (UEFI), and/or a variety of other SIF's known in the art), and/or a variety of other software 208c known in the art may be located on one or more non-transitory, computer-readable mediums (e.g., the storage device 108, the system memory 114, and/or variety of other computer-readable mediums known in the art) that are coupled to the processor 204. As is known in the art, the operating system 208a, the SIF 208b, and/or the other software 208c may be provided by computer-readable instructions on the computer-readable medium that, whenever executed by the processor 204, cause the processor 204 to perform functions of the operating system, the SIF, and/or other software. An endpoint device 210 is coupled to the connector 206 over a link 212 such as, for example, a PCIe link. In the embodiment described below, the endpoint device 210 is a PCIe endpoint device such as, for example, an Ethernet controller, a storage device (e.g., Small Computer System Interface (SCSI) device and/or a variety of other storage devices known in the art), a video device (e.g., a display), an audio device (e.g., a speaker system, a microphone), and/or a variety of other PCIe endpoint devices known in the art. However, one of skill in the art will recognize that a variety of other types of endpoint devices will fall within the scope of the present disclosure.

Figure 2B:
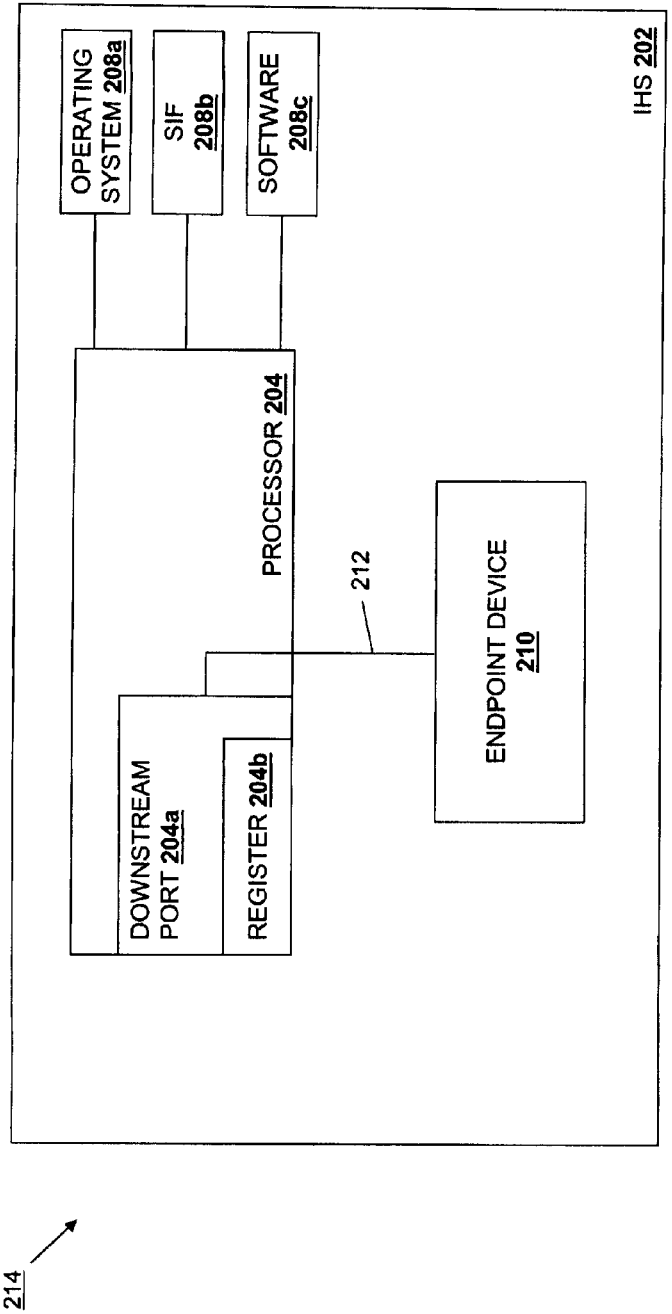
FIG. 2b is a schematic view illustrating another embodiment of an endpoint device discovery system.

Referring now to FIG. 2b, an embodiment of an endpoint device discovery system 214 is illustrated that is substantially similar in structure and operation to the endpoint discovery system 200 illustrated in FIG. 2a, but with the removal of the connector 206 and with the endpoint device 210 directly coupled to the downstream port 204a. For example, the endpoint device 210 may be a PCIe device that is embedded on a motherboard and coupled to the downstream port 204a through the motherboard and the processor 204 using methods known in the art.

Figure 3:
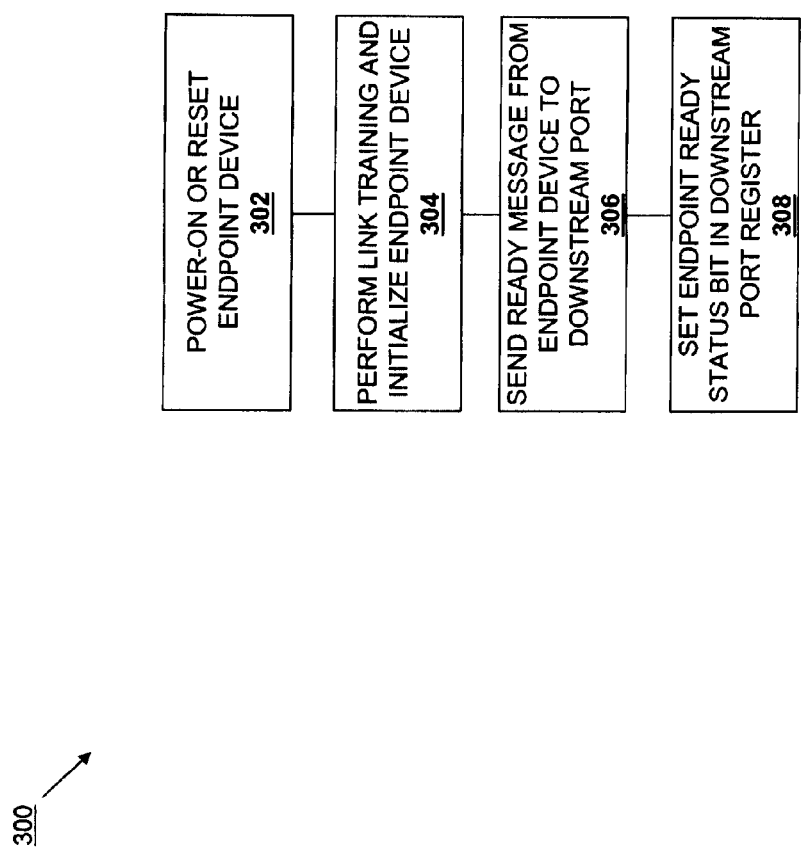
FIG. 3 is a flow chart illustrating an embodiment of a method for endpoint device discovery.

Referring now to FIGS. 2a, 2b, and 3, an embodiment of a method 300 for endpoint device discovery is illustrated. The embodiment of the method 300 describes a hardware method flow performed in order to provide for the endpoint device discovery of the present disclosure. The method 300 begins at block 302, where an endpoint device is powered-on or reset. In an embodiment, the endpoint device 210 is powered-on at block 302 of the method 300 in response to a power-on or boot of the IHS 202. In another embodiment, the endpoint device 210 is powered-on at block 302 of the method 300 in response to being connected to the already powered-on IHS 202 (e.g., a "hot-plug" of the endpoint device 210 to the IHS 202). In another embodiment, the endpoint device 210 is reset (e.g., a PCIe reset, a function level reset (FLR), etc.) at block 302 of the method 300 by the operating system 208a, the SIF 208b, and/or other software 208c in response to an error occurring in the endpoint device 210, in response to moving a function of the endpoint device 210 between guest operating systems in a virtualization environment, and/or in response to a variety of other endpoint device reset situations known in the art. While a plurality of examples of endpoint device power-on or reset have been provided above, one of skill in the art will recognize that a variety of other endpoint device power-on or reset situations will fall within the scope of the present disclosure. Furthermore, other actions that cause the endpoint device to begin endpoint device initialization, discussed below, will fall within the scope of the present disclosure.

The method 300 then proceeds to block 304 where link training is performed and the endpoint device is initialized. In the illustrated embodiment, PCIe link training, which is known in the art as a protocol use to establish link configuration parameters such as link width, lane polarities, and/or maximum supported data rate, is performed by the endpoint device discovery system 200 at block 304 of the method 300. Furthermore, at block 304 of the method 300, the endpoint device 210 begins and executes endpoint device initialization. In an embodiment where the endpoint device is a PCIe device, endpoint device initialization may include initializing state machines and reading configuration data from a memory (e.g., an electrically erasable programmable read-only memory (EEPROM)).

When the endpoint device initialization executed in block 304 of the method 300 is complete, the method 300 then proceeds to block 306 where a ready message is sent from the endpoint device to the downstream port. In an embodiment, upon completion of endpoint device initialization, the endpoint device 210 sends an endpoint ready message to the downstream port 204a through the coupling between the endpoint device 210 and the downstream port 204a (e.g., the link 212, the connector 206, busses, and/or the processor 204). In another embodiment, the endpoint device 210 may send the endpoint ready message to the downstream port 204a prior to the completion of endpoint initialization as long as it is determined that the endpoint device 210 will complete endpoint device initialization prior to software in the IHS 202 attempting to access the endpoint device 210 in response to checking an endpoint ready status bit that is set upon receipt of the endpoint ready status message. The method 300 then proceeds to block 308 where an endpoint ready status bit is set in a downstream port register. In an embodiment, in response to receiving the endpoint ready message from the endpoint device 210 in block 306, the downstream port 204a sets an endpoint ready status bit in the register 204b.

Figure 4:
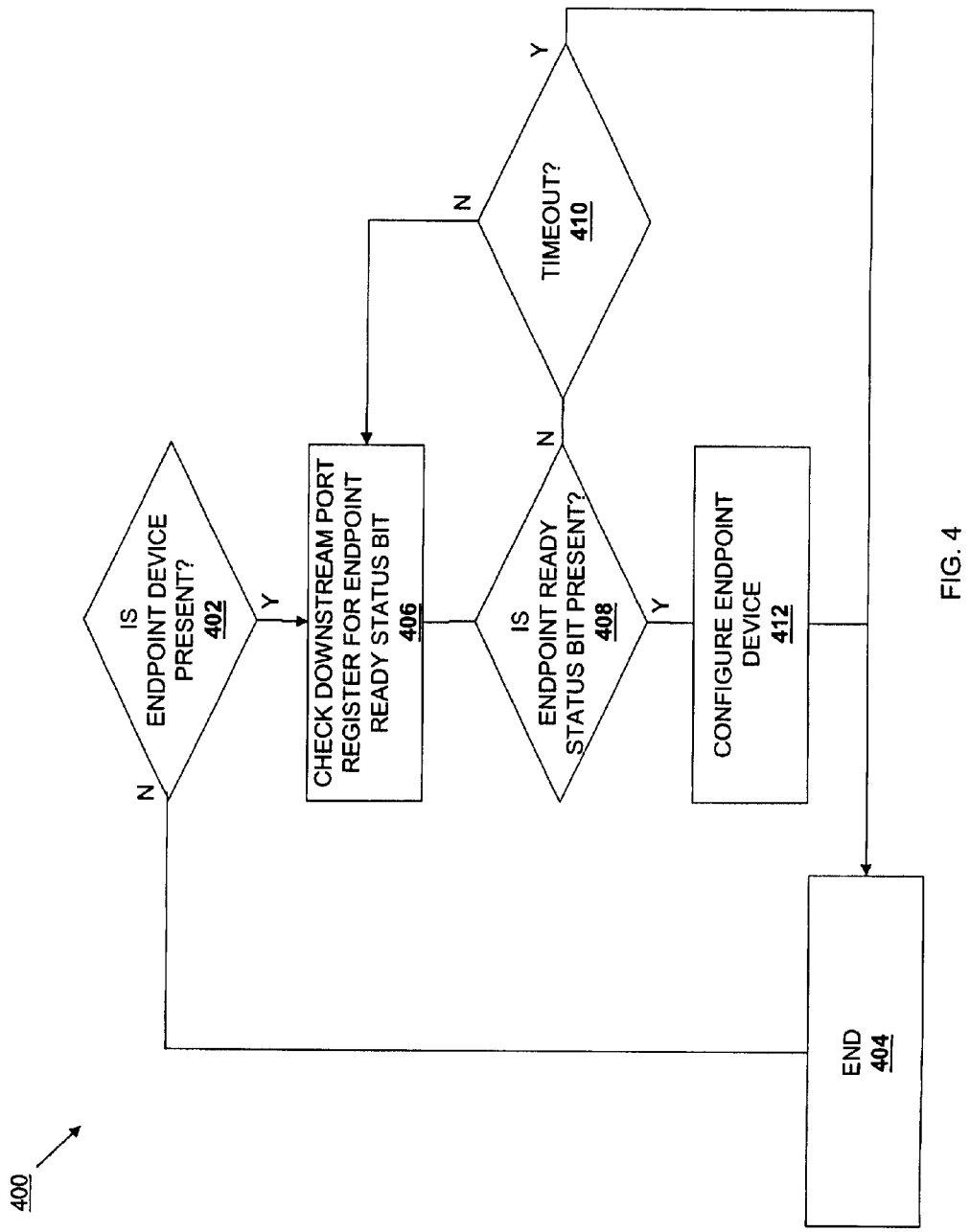
FIG. 4 is a flow chart illustrating an embodiment of a method for endpoint device discovery.

Referring now to FIGS. 2 and 4, an embodiment of a method 400 for endpoint device discovery is illustrated. The embodiment of the method 400 describes a software method flow performed in order to provide for the endpoint device discovery of the present disclosure. In an embodiment, the software method flow illustrated in FIG. 4 may be performed by the operating system 208a, the SIF 208b, and/or other software 208c in the IHS 200. For example, any software involved in the initialization of the endpoint device 210 may perform the method 400. The method 400 begins at decision block 402, where it is determined whether an endpoint device is present. In an embodiment where the endpoint device 210 is a PCIe device, the software performing the method 400 determines whether the endpoint device 210 is present by checking a bit in the downstream port 204a that includes a presence detect state. If at decision block 402, it is determined that the endpoint device 210 is not present, the method 400 proceeds to block 404 where the method 400 ends.

If at decision block 402, it is determined that the endpoint device 210 is present, the method 400 proceeds to block 406 where the register in the downstream port is checked for an endpoint ready status bit. In an embodiment, the software performing the method 400 may poll the register 204b in the downstream port 204a to check for the endpoint ready status bit. The method 400 then proceeds to decision block 408 where it is determined whether the endpoint ready status bit is present. If at decision block 408 the software performing the method 400 determines that the endpoint ready status bit is not present, the method 400 proceeds to decision block 410 to determine whether the method 400 has timed-out. In an embodiment, upon the detection of the endpoint device being present at decision block 402, a clock may be started, and at decision block 410, the software performing the method 400 may compare the clock time to a predetermined time-out time to determine whether the clock time exceeds the predetermined time-out time. If the clock time does not exceed the predetermined time-out time at decision block 410, the method 400 returns to block 406 and decision block 408 to check the register in the downstream port to determine whether the endpoint ready status bit is present. Thus, as long as the method 400 has not timed-out, the software performing the method 400 will continue to check the register in the downstream port for the endpoint ready status bit. If the clock time exceeds the predetermined time-out time at decision block 410, the method 400 proceeds to block 404 where the method 400 ends.

If at decision block 408, it is determined that the endpoint ready status bit is present, the method 400 proceeds to block 412 where the endpoint device is configured. In an embodiment, upon determining that the endpoint ready status bit is present in the register 204b of the downstream port 204a, the software performing the method 400 will access and configure the endpoint device 412. In an embodiment where the endpoint device 210 is a PCIe device, configuration of the endpoint device 210 includes programming PCIe configuration registers to control how the PCIe device will behave. For example, resources such as memory, input/output (I/O), interrupts, and bus numbers may be assigned, and/or a variety of PCIe features known in the art may be enabled. Upon completing configuration of the endpoint device 210, the method 400 proceeds to block 404 where the method 400 ends.

Thus, and endpoint device discovery system has been described that provides for the communication upstream by an endpoint device as soon as the endpoint device is ready to be accessed such that a status bit may be set and referenced by software to indicate to the software that the endpoint device is available for access and configuration. In conventional systems, after power-on or reset, software has no way to determine when an endpoint device is available as the software has no access to the endpoint device, and as discussed above, any attempts to access the endpoint device during initialization can cause errors. The active availability reporting by endpoint devices described in the present disclosure provides substantial benefits over the prior art systems that require software to wait a minimum time before attempting to access the endpoint device, including but not limited to providing reduced boot times, allowing hot-plugged endpoint devices to be accessed quicker than in conventional systems, and allowing for speedier error recovery relative to conventional systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An endpoint device discovery system, comprising:
   an information handling system (IHS) chassis;
   a downstream port that is located in the IHS chassis;
   a register that is located in the IHS chassis and that is coupled to the downstream port, wherein an endpoint ready status bit is configured to be set in the register in direct response to an endpoint ready message that is received at the downstream port from an endpoint device that is coupled to the downstream port and that has experienced a power-on or reset operation; and
   a non-transitory computer-readable medium that is located in the IHS chassis, that is coupled to the register, and that comprises computer-readable instructions that, when executed by a processor that is located in the IHS chassis, prevent the processor from attempting to communicate with the endpoint device following the power on or reset operation until the processor determines that the endpoint ready status bit has been set in direct response to receiving the endpoint ready message from the endpoint device and, in direct response to determining that the endpoint ready status bit has been set in direct response to receiving the endpoint ready message from the endpoint device, cause the processor to automatically access and configure the endpoint device.

2. The system of claim 1, wherein an endpoint device connector is coupled to the downstream port and configured to couple to the endpoint device that is external to the chassis, and wherein the register is included in the downstream port.

3. The system of claim 1, wherein the downstream port is included in the processor.

4. The system of claim 1, further comprising:
   an endpoint device coupled to the downstream port, wherein the endpoint device is configured to send the endpoint ready message in response to the endpoint device completing initialization.

5. The system of claim 1, further comprising:
   an endpoint device coupled to the downstream port, wherein the endpoint device is configured to send the endpoint ready message during initialization in response to determining that the endpoint device will complete initialization prior to the processor attempting to communicate with the endpoint device.

6. The system of claim 1, wherein the power on or reset operation of the endpoint device is initiated by one of an operating system and a system initialization firmware (SIF).

7. The system of claim 2, wherein the endpoint device connector is a Peripheral Component Interconnect express (PCIe) connector.

8. An information handling system (IHS), comprising:
   an endpoint device that is configured to send an endpoint ready message during an initialization operation in direct response to determining that the endpoint device will complete the initialization operation prior to being accessed;
   an IHS chassis;
   a processor that is located in the IHS chassis;
   a memory that is located in the IHS chassis and that is coupled to the processor;
   a register that is located in the IHS chassis and that is coupled to the processor, wherein an endpoint ready status bit is configured to be set in the register in direct response to receiving the endpoint ready message from the endpoint device; and
   a non-transitory computer-readable medium that is coupled to the processor, wherein the non-transitory computer-readable medium comprises computer-readable instructions that, when executed by the processor, prevent the processor from attempting to communicate with the endpoint device until the initialization operation of the endpoint device is complete by having the processor monitor the register to determine that the endpoint ready status bit has been set in direct response to receiving the endpoint ready status bit message from the endpoint device and, in direct response to determining that the endpoint ready status bit has been set in direct response to receiving the endpoint ready status bit message from the endpoint device, cause the processor to automatically access and configure the endpoint device.

9. The IHS of claim 8, further comprising:
   a downstream port that is located in the IHS chassis and that is coupled to the processor, wherein the register is included in the downstream port.

10. The HIS of claim 9, wherein the downstream port is included in the processor.

11. The IHS of claim 8, further comprising:
    an endpoint device connector that is located on the IHS chassis, that is coupled to the processor, and that is coupled to the endpoint device that is external to the IHS chassis, wherein the register is configured to receive the endpoint ready message from the endpoint device through the endpoint device connector.

12. The IHS of claim 8, wherein the endpoint device is included in the IHS chassis.

13. The IHS of claim 8, wherein the endpoint device is a Peripheral Component Interconnect (PCI) device.

14. The IHS of claim 8, wherein the endpoint device is configured to begin the initialization operation in response to either being powered on or being reset.

15. A method for endpoint device discovery, comprising:
    causing an endpoint device to begin an initialization operation;
    sending an endpoint ready status message from the endpoint device to an IHS that includes an IHS chassis in direct response to determining that the endpoint device will complete the initialization operation prior to being accessed;
    setting an endpoint ready status bit in a register that is included in the IHS chassis in direct response to receiving the endpoint ready status message from the endpoint device;
    determining, by a processor that is included in the IHS chassis executing instruction on a memory that is included in the IHS chassis, that the endpoint ready status bit has been set; and
    automatically accessing and configuring the endpoint device in direct response to determining the endpoint ready status bit has been set in direct response to receiving the endpoint ready message from the endpoint device, wherein the instructions on the memory prevent the processor from attempting to communicate with the endpoint device until the initialization operation is determined to be complete in direct response to the determination that the endpoint ready status bit has been set in direct response to receiving the endpoint ready message from the endpoint device.

16. The method of claim 15, wherein the causing the endpoint device to begin the initialization operation includes either powering on the endpoint device or resetting the endpoint device.

17. The method of claim 16, wherein the endpoint device sends the endpoint ready status message in direct response to completing the initialization operation.

18. The method of claim 15, wherein the endpoint device is external to the IHS chassis.

19. The method of claim 15, wherein the register is included in a downstream port that is coupled to the processor.

20. The method of claim 19, wherein the downstream port is included in the processor.

* * * * *